United States Patent
Velusamy et al.

(10) Patent No.: US 9,515,837 B1
(45) Date of Patent: Dec. 6, 2016

(54) POLICY IMPLEMENTATION DURING CHARGING SERVER INTERRUPTION

(71) Applicant: Sprint Communications Company L.P., Overland Park, KS (US)

(72) Inventors: Saravana Velusamy, Olathe, KS (US); Ryan J. McGinn, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 105 days.

(21) Appl. No.: 14/197,528

(22) Filed: Mar. 5, 2014

(51) Int. Cl.
*H04L 12/813* (2013.01)
*H04L 12/14* (2006.01)
*H04W 12/12* (2009.01)

(52) U.S. Cl.
CPC .......... *H04L 12/1407* (2013.01); *H04L 47/20* (2013.01); *H04W 12/12* (2013.01)

(58) Field of Classification Search
CPC .. H04L 12/1407; H04L 47/20; H04M 15/66; H04W 12/12
See application file for complete search history.

(56) References Cited

U.S. PATENT DOCUMENTS

| | | | | |
|---|---|---|---|---|
| 8,086,216 B2* | 12/2011 | Feder | ..................... | H04L 12/14 455/405 |
| 2012/0064878 A1* | 3/2012 | Castro Castro | ......... | H04L 12/14 455/418 |
| 2012/0264443 A1* | 10/2012 | Ng | ........................ | H04W 4/005 455/450 |
| 2013/0329554 A1* | 12/2013 | Centoza | ................ | H04W 28/08 370/230.1 |

* cited by examiner

*Primary Examiner* — Raj Jain

(57) ABSTRACT

Examples disclosed herein provide systems, methods, and software for providing default policy information from a policy and charging rules function (PCRF). In one example, a PCRF is configured to identify an interruption in communications with an online charging server. Responsive to this identification, the PCRF transfers a default policy requirement notification to a packet data network gateway. Based on the default policy requirement notification, the packet data network gateway transfers a default policy rule request to the PCRF. In response to the request, the PCRF identifies default policy rules and transfers the default policy rules to the packet data network gateway to be implemented.

17 Claims, 4 Drawing Sheets

POLICY IMPLEMENTATION DURING CHARGING SERVER INTERRUPTION

TECHNICAL BACKGROUND

Wireless communication systems typically include wireless access systems with equipment such as wireless access nodes, along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless devices, service providers, and other end user devices. The user communications typically include voice calls, data exchanges, web pages, streaming media, or text messages, among other communication services.

In some examples, an online charging server, or OCS, may monitor the data connections for the wireless devices. The OCS is a system that allows communication service providers to charge their customers, in real time, based on service usage. To accomplish this task, the wireless communication must be consistently monitored to ensure that the user is permitted to use the requested amount of data. If the user is out of data, then the OCS can be used to assist in terminating the communication and prevent the device from joining the network.

Further, in some instances, a wireless communication system may include a policy and charging rules function (PCRF) that can communicate with both the OCS and packet data network gateways. The PCRF is responsible for managing the policy function for bandwidth and charging on multimedia networks. This management may include determining whether a wireless communication is allowed, throttled, redirected, or other similar actions. These actions may be based on information provided by the OCS, which dictates the amount of data that the device is currently using.

OVERVIEW

Examples disclosed herein provide systems and methods for providing default policy information or rules to packet data network gateways. In one example, a method of operating a communication system includes, in a policy and charging rules function (PCRF) system, identifying a communication interruption between the PCRF system and an online charging server. The method further provides, in the PCRF system and responsive to identifying the communication interruption, transferring a default policy requirement notification to a packet data network gateway. The method also includes, in the packet data network gateway, receiving the default policy requirement notification and responsively transferring a default policy rule request to the PCRF system. The method additionally provides, in the PCRF system, receiving the default policy rule request, identifying default policy rules, and transferring the default policy rules to be received by the packet data network gateway.

BRIEF DESCRIPTION OF THE DRAWINGS

Many aspects of the disclosure can be better understood with reference to the following drawings. The components in the drawings are not necessarily to scale, emphasis instead being placed upon illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
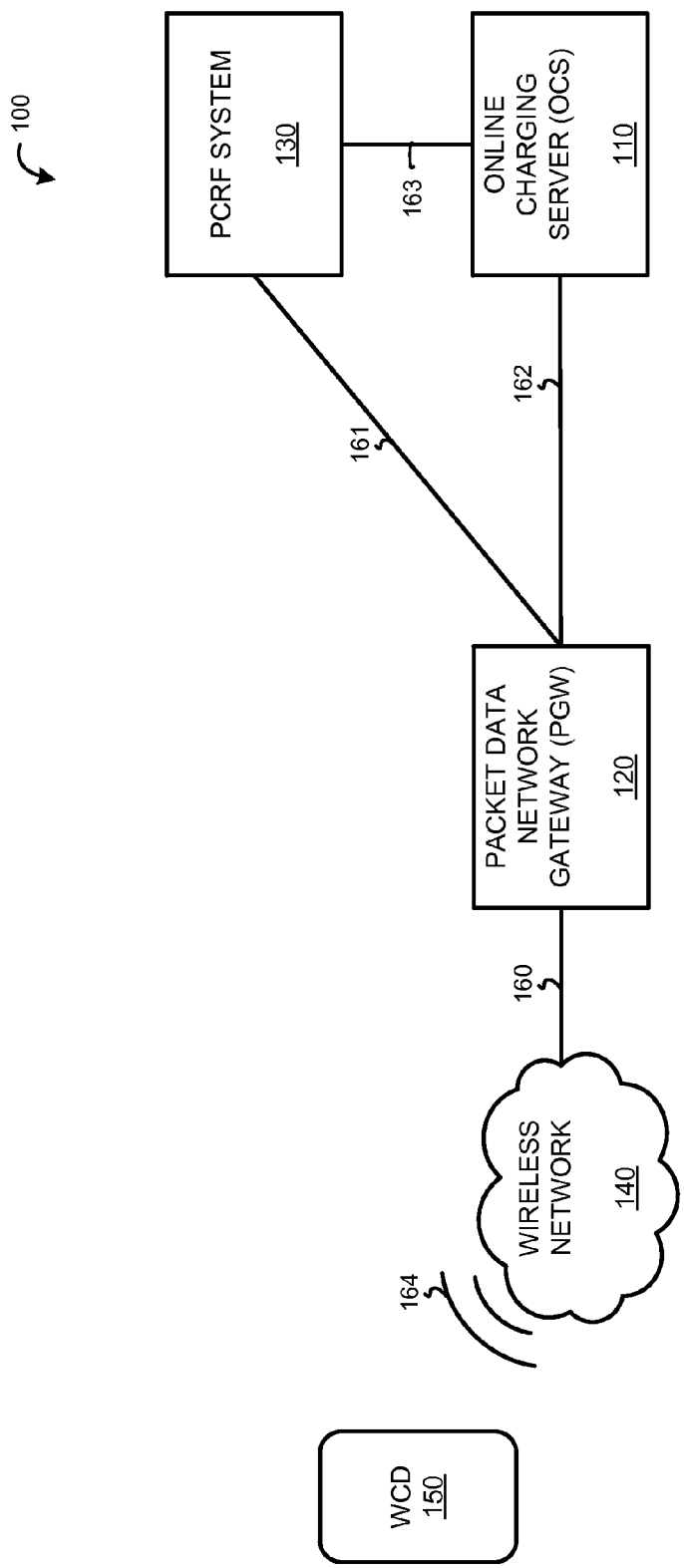
FIG. 1 illustrates a communication system for providing default policy rules to a packet data network gateway.

FIG. 1 illustrates a communication system for providing default policy rules to a packet data network gateway. Communication system 100 includes online charging server (OCS) 110, packet data network gateway (PGW) 120, policy and charging rules function (PCRF) system 130, wireless network 140, and wireless communication device (WCD) 150. PGW 120 communicates with wireless network 140 over communication link 160, and further communicates with PCRF system 130 and OCS 110 over communications links 161 and 162, respectively. OCS 110 further communicates with PCRF system 130 over communication link 163. Wireless network 140 communicates with WCD 150 over wireless sector 164.

In operation, WCD 150 may include a variety of applications or processes that require data communications over wireless network 140. These applications and processes may include voice applications, email applications, file-sharing applications, news applications, or any other similar application or process. Once a communication is requested for one of these applications, PGW 120 acts as the interface between wireless network 140 and other packet data networks, such as the Internet or Internet Multimedia Subsystem networks.

To provide the communication, PGW 120 communicates with external systems, such as OCS 110 and PCRF system 130 to identify permissions for the communication. PCRF system 130 manages, in real-time, bandwidth and charging on multimedia networks. To manage the bandwidth and other policy information under normal operations, PCRF system 130 communicates with OCS 110 using a link or Sy interface to gather usage information for the connecting wireless devices. Such usage information may include whether a device has data remaining, the rate at which the device is using the data, or any other relevant data usage information.

In addition to providing the data usage information to PCRF system 130, OCS 110 provides data quotas for wireless devices to PGW 120. These data quotas comprise portions of the total data available to each of the wireless devices. For example, if the total data for a wireless device were one gigabyte, a portion provided in a data quota may be one megabyte or any other portion of the total data available. Once a wireless device has exhausted one quota, PGW 120 may continue to inquire OCS 110 for data quotas until the communication is complete.

Returning to the communication between OCS 110 and PCRF system 130, the usage information gathered by PCRF system 130 is typically used to generate policy information for the wireless devices. Such policy information may include whether the communications for a wireless device are allowed, throttled, redirected, or other similar actions. In some examples, other considerations may be taken to generate the policy information, such as the time of day for the connection, the number of other devices connecting, the type of application that requests the communication, or any other similar consideration.

Although the communications between OCS 110 and PCRF system 130 are configured to be continual, in some instances the communication link between the two systems may be interrupted. Such may be the case if a communication link is broken, online charging server 110 is malfunctioning, or any other reason for an interruption. Accordingly, PCRF system 130 may no longer be able to rely on the data usage information provided by OCS 110. Instead, PCRF system 130 may identify default device policy information to pass to the PGW 120. This default information may be based on a quality of service for the wireless device, as well as the other factors previously discussed for the policy information.

Figure 2:
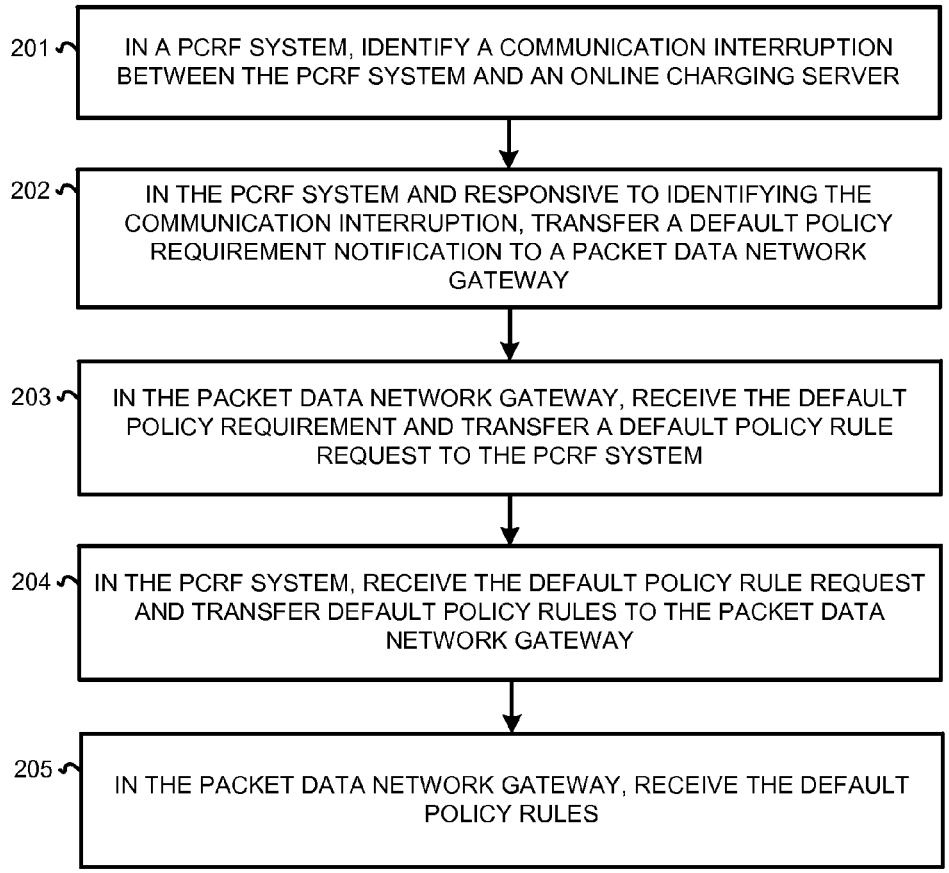
FIG. 2 illustrates an operation of a communication system for providing default policy rules to a packet data network gateway.

To further illustrate the operation of communication system 100, FIG. 2 is provided. FIG. 2 illustrates an operation of a communication system for providing default policy rules. As depicted, a PCRF system is configured to identify a communication interruption between the PCRF system and an online charging server (201). In typical operation, PCRF system 130 is configured to gather data usage information using a Sy interface from OCS 110 and use the information to provide policy rules to PGW 120. Such data usage information may include whether a wireless device has any remaining data to make a data communication, the rate at which a device is using data in a data communication, or any other information about data usage for the wireless device. If a device does not have any data available, then the policy rules may specify for PGW 120 that the device is not allowed to make a particular communication. However, if the communication link between OCS 110 and PCRF system 130 is interrupted, then PCRF system 130 may not be able to determine the amount of data that is remaining for the wireless device. Accordingly, the PCRF system is further configured to, in response to identifying the communication interruption, transfer a default policy requirement notification to the packet data network gateway (202). This default policy requirement notification, which may comprise a session-rule-check attribute-value pair (AVP), is used to command the packet data network gateway to query for default policy rules that are determined without checking the data usage information provided from OCS 110.

In response to receiving the default policy requirement notification, the packet data network gateway is configured to transfer a default policy rule request to the PCRF system (203). This query is used to update PGW 120 to reflect the default rules that are required without the Sy interface communication. Once the default policy rule request is received by the PCRF system, the rules function is configured to transfer default policy rules to the packet data network gateway (204). In some instances, these default policy rules are based on a quality of service for the connecting wireless devices. For example, a wireless device with a high quality of service may be able to communicate for longer periods of time or use a larger amount of bandwidth than a device with a lower quality of service. Once transferred, PGW 120 is configured to receive the default policy rules and implement them for various connecting wireless devices (205).

In some examples, the Sy interface between PCRF system 130 and OCS 110 may be interrupted for a longer period of time. Accordingly, PCRF system 130 may require PGW 120 to query for default policy rules multiple times to adjust for the length of the Sy outage, the change in devices connected to PGW 120, a change in the default policy rules at PCRF system 130, or for any other adjustment purpose. Accordingly, PCRF system 130 may notify PGW 120 of the necessity to query for default rules periodically or based on events, such as new devices communicating using the packet data network gateway.

Figure 3:
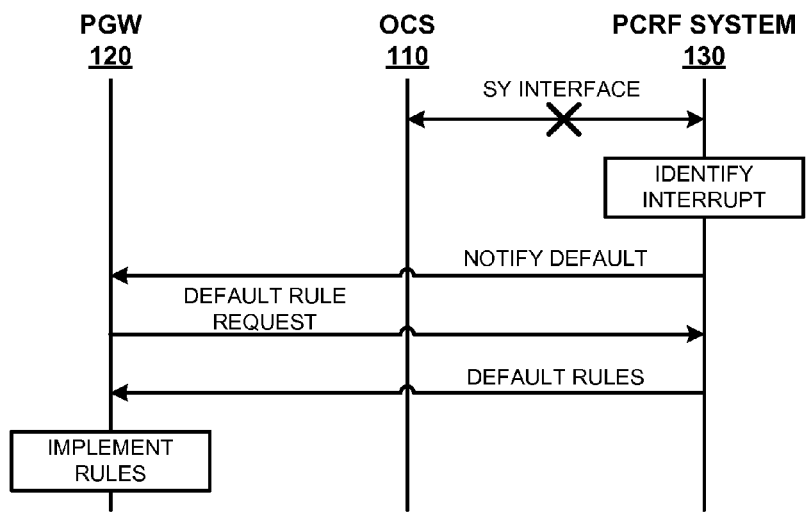
FIG. 3 illustrates a timing diagram for providing default policy rules to a packet data network gateway.

For a further illustration of the operation of communication system 100, FIG. 3 is included. FIG. 3 illustrates a timing diagram 300 for providing default policy rules to a packet data network gateway. As illustrated, OCS 110 and PCRF system 130 typically communicate using a link or Sy interface that allows PCRF system 130 to identify data usage characteristics for communicating wireless devices. In some examples, these data usage characteristics identify when a device has exhausted available data in a device account. Accordingly, based on the exhaustion, PCRF system 130 may provide rules that do not allow the device to communicate.

However, in the present example, the interface between PCRF system 130 and OCS 110 is interrupted, preventing PCRF system 130 from gathering data usage characteristics from OCS 110. In response, PCRF system 130 is configured to identify the interruption and transfer a default policy requirement notification to PGW 120. This default policy requirement notification ensures that PGW 120 gathers default rules before providing communications to wireless devices. Once received by PGW 120, PGW 120 may transfer a default device policy rule request to PCRF system 130. Responsive to the rule request, PCRF system 130 identifies default policy rules and transfers the rules to PGW 120. These default policy rules may be used to prevent a user from exceeding the allotted data in the device account. For example, the default rules may allow a device with a higher quality of service to communicate for longer periods, or with a greater amount of bandwidth than a device with a lower quality of service to prevent the devices from exceeding their allotted amount of data. This quality of service may be based on payment history data for the device, such as the promptness and amount paid by the user, the total amount of data allocated to the device, or any other quality of service determination. Further, if the Sy interface is interrupted for a longer period of time, PCRF system 130 may require PGW 120 to request default rules multiple times to adjust to the devices connecting to the packet data network gateway, to adjust to the length of time in the interruption, or any other adjustment factor.

Although not illustrated, once the communication link is reestablished between PCRF system 130 and OCS 110, PCRF system 130 may again provide rules based on the amount of data consumed by the wireless devices. In some instances, this may include passing a reestablishment notification to PGW 120 indicating that rules based on data usage are available.

Figure 4:
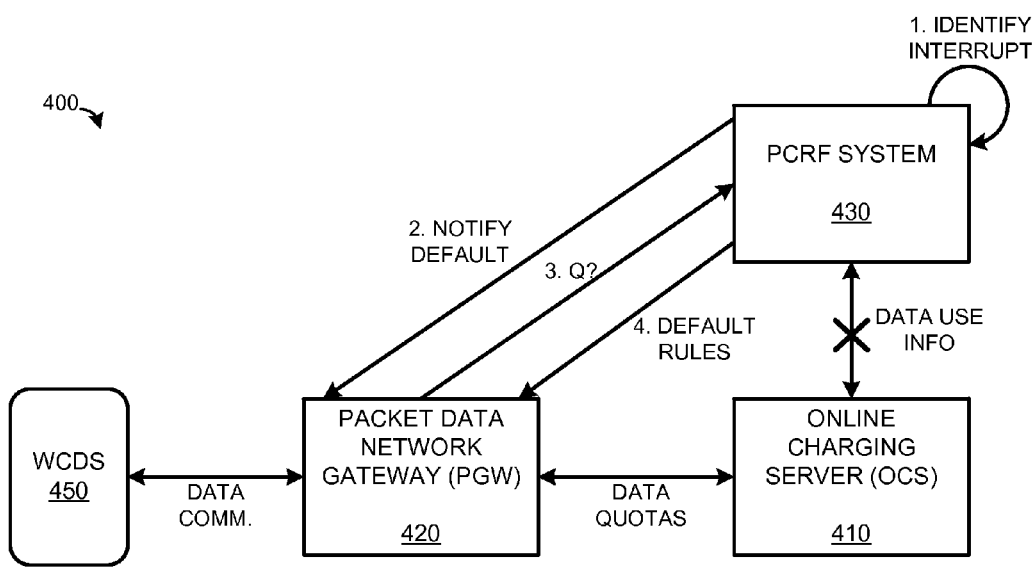
FIG. 4 illustrates an overview for providing default policy rules to a packet data network gateway.

Referring now to FIG. 4, FIG. 4 illustrates an overview 400 for providing default policy rules to a packet data network gateway. Overview 400 includes online charging server (OCS) 410, packet data network gateway (PGW) 420, PCRF system (PCRF) system 430, and wireless communication devices (WCDs) 450. In operation, WCDs 450 may include applications or other processes that communicate with networked systems over PGW 420. To facilitate the communications, PGW 420 is configured to communicate with OCS 410 to gather data quotas from OCS 410. These data quotas provide amounts of data for the devices to use in the communication. In some examples, these data quotas may comprise a portion or segment of the total amount of data available to each of the wireless communication devices.

Based on the data usage or the amount of data provided by OCS 410, OCS 410 is configured to pass data usage information to PCRF system 430 using a Sy interface. This data usage information allows PCRF system 430 to determine when a device has exhausted the allotted amount of data and generate a policy that prevents the device from further communication. Although PCRF system 430 and OCS 410 are configured to be in constant communication to provide data usage information about the connecting wireless devices, the communication link between the systems may be interrupted in some examples. This interruption may occur when the communication links are disabled between the systems, OCS 410 has an issue communicating information, or for any other interruption.

Once the interruption occurs, PCRF system 430 is configured to identify the interruption, and transfer a default policy requirement notification or Session-Rule-Check AVP to PGW 420, indicating that there has been an interruption. In response to the default policy requirement, PGW 420 is configured to transfer a default policy rules request to PCRF system 430. Upon receipt of the rules request, PCRF system 430 is configured to identify default policy rules and transfer the default policy rules to PGW 420. In some examples, the default policy rules may indicate information such as whether a device is allowed, throttled, redirected, or other similar actions within the wireless network. In some instances, the rules may be defined by a quality of service for each of the wireless devices. For example, a device that has a higher quality of service may not be disallowed, throttled, or redirected at the same rate as a device with a lower quality of service. By providing default rules, PCRF system 430 may control which devices are allowed to use the most data across the wireless system. Thus, PCRF system 430 may prevent devices with a lower quality of service from exploiting the Sy interface interruption for unpermitted data communications.

Although not illustrated in overview 400, PCRF system 430 is also configured to identify the reestablishment of the Sy interface, and notify PGW 420 to resume typical operation based on the amount of data used by each of the wireless devices. Further, although only a single packet data network gateway is provided in overview 400 for simplicity, it should be understood that any number of packet data network gateways might communicate with PCRF system 430 to gather policy information for connecting wireless devices.

Figure 5:
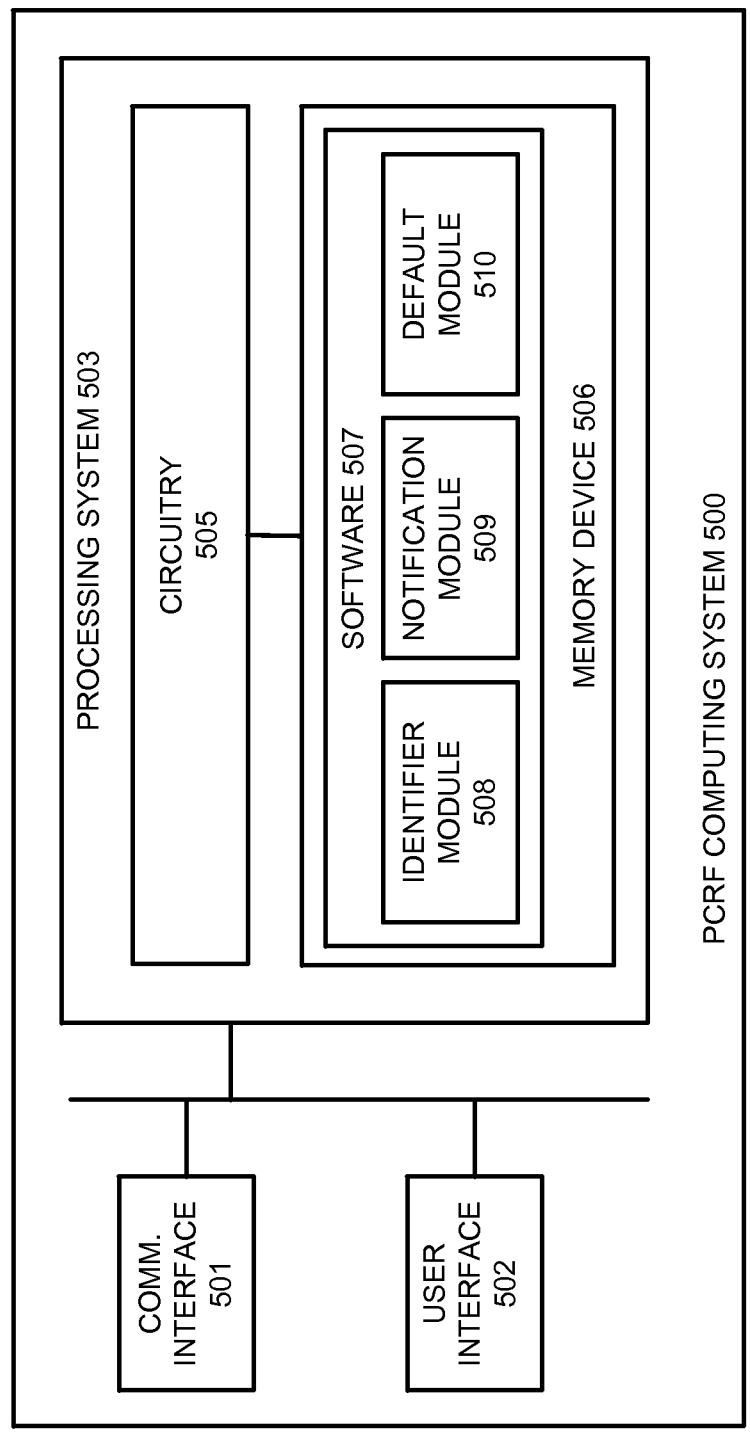
FIG. 5 illustrates a policy and charging rules function computing system for providing default policy rules.

Turning to FIG. 5, FIG. 5 illustrates a policy and charging rules function (PCRF) computing system 500 for providing default policy rules. PCRF computing system 500 is an example of PCRF systems 130 and 430, although PCRF system 130 and 430 may use alternative configurations. PCRF computing system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes identifier module 508, notification module 509, and default module 510. Operating software 507 may further include an operating system, utilities, drivers, network interfaces, applications, or some other type of software. When executed by circuitry 505, operating software 507 directs processing system 503 to operate PCRF computing system 500 as described herein.

In particular, communication interface 501 communicates with packet data network gateways to provide policy rules, and communicates with an online charging server to gather real time data usage information for wireless communication devices. Identifier module 508 directs processing system 503 to identify when the communication link between computing system 500 and the online charging server is interrupted. Responsive to the interruption, notification module 509 directs processing system 503 to transfer a default policy requirement notification to the packet data network gateways indicating that there has been an interruption. Further, communication interface 501 is configured to receive default policy rule requests from the packet data network gateways. In response to the rule requests, default module 510 identifies default policy rules for the packet data network gateways and transfers these rules to the gateways.

In some examples, the default policy rules are based on a quality of service for the connecting wireless communication devices. For instance, a device with a lower quality of service may be disallowed, throttled, or redirected at a different rate than a device with a higher quality of service. This quality of service may be based on the total amount of data allocated for the device, the amount paid for the wireless device, the timeliness of payments for the device, or any other data or payment history information. By providing policy rules based on quality of service, computing system 500 may ensure that devices that are not permitted to use large quantities of data cannot overwhelm the system during a communication interruption with the online charging server.

In addition to providing the default policy rules, computing system 500 may, in some instances, identify when the communication link with the online charging server is reestablished. Accordingly, computing system 500 may notify the packet data network gateways of the reestablished communication and compel the gateways to gather new rules based on data usage information.

Returning to FIG. 1, online charging server (OCS) 110 may comprise any computing system with the ability to provide data quotas to packet data network gateways and transfer data usage information to policy and charging rules function systems. OCS 110 may include processing systems, user interfaces, communication interfaces, storage systems, or other similar computing elements.

PGW 120 may comprise any computing devices capable of acting as a gateway between the wireless network and the other packet data networks, such as the Internet or Internet Multimedia Subsystem networks. PGW 120 may include processing systems, user interfaces, communication interfaces, storage systems, or other similar computing elements.

PCRF system 130 may comprise any device or devices configured to manage policy rules for communicating wireless devices. Such policy rules may include allowing, throttling, and redirecting wireless communication devices on the wireless network. PCRF system 130 may include processing systems, user interfaces, communication interfaces, storage systems, or other similar computing elements.

Wireless network 140 is configured to provide communication services to various wireless devices using Long Term Evolution (LTE), Code Division Multiple Access (CDMA), Evolution Data Only (EVDO) or some other wireless communication format. Wireless network 140 may comprise switches, access nodes, Internet routers, network gateways, application servers, computer systems, communication links, or some other type of communication equipment—including combinations thereof.

Wireless communication device (WCD) 150 comprises Radio Frequency (RF) communication circuitry and an antenna. The RF communication circuitry typically includes an amplifier, filter, modulator, and signal processing circuitry. Wireless communication device 150 may also include a user interface, memory device, software, processing circuitry, or some other communication components. Wireless communication device 150 may be a telephone, computer, e-book, mobile Internet appliance, wireless network interface card, media player, game console, or some other wireless communication apparatus.

Communication links 160-163 use metal, glass, air, space, or some other material as the transport media. Communication links 160-163 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 160-163 could be direct links or may include intermediate networks, systems, or devices.

Communication sector 164 includes wireless links that use the air or space as a transport media. These wireless links may communicate using Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to provide default policy information comprising:
    in a policy and charging rules function (PCRF) system, identifying a Sy interface interruption between the PCRF system and an online charging server;
    in the PCRF system and responsive to identifying the Sy interface interruption, transferring a default policy requirement notification for delivery to a packet data network gateway;
    in the packet data network gateway, receiving the default policy requirement notification and transferring a default policy rule request for delivery to the PCRF system;
    in the PCRF system, receiving the default policy rule request, identifying default policy rules, and transferring the default policy rules for delivery to the packet data network gateway;
    in the packet data network gateway, receiving the default policy rules;
    in the PCRF system, identifying a reestablished communication between the PCRF system and the online charging server and, in response to identifying the reestablished communication, transferring a notification to the packet data network gateway to indicate the reestablished communication; and
    in the packet data network gateway, receiving the notification.

2. The method of claim 1 wherein identifying the default policy rules comprises:
    identifying a quality of service for each wireless communication device in a plurality of wireless communication devices; and
    identifying policy rules based on the quality of service.

3. The method of claim 2 wherein the quality of service is based on a total amount of data allocated to each respective wireless communication device in the plurality of wireless communication devices.

4. The method of claim 2 wherein the quality of service is based on payment history data associated with each respective wireless communication device in the plurality of wireless communication devices.

5. The method of claim 1 wherein transferring the default policy requirement notification for delivery to the packet data network gateway comprises transferring a session-rule-check attribute-value pair for delivery to the packet data network gateway.

6. The method of claim 1 further comprising:
    in the packet data network gateway and in response to receiving the notification, transferring a request for policy rules based on the reestablished communication.

7. The method of claim 1 further comprising:
    in the PCRF system and prior to identifying the reestablished communication, transferring a subsequent default policy requirement notification for delivery to the packet data network gateway;
    in the packet data network gateway, receiving the subsequent default policy requirement notification and responsively transferring a subsequent default policy rule request for delivery to the PCRF system; and
    in the PCRF system, receiving the subsequent default policy rule request, identifying subsequent default policy rules, and transferring the subsequent default policy rules for delivery to the packet data network gateway.

8. A communication system to provide default policy information, the system comprising:

a packet data network gateway;
a policy and charging rules function (PCRF) system configured to identify a Sy interface interruption between the PCRF system and an online charging server, and responsively transfer a default policy requirement notification for delivery to the packet data network gateway;
the packet data network gateway configured to receive the default policy requirement notification and transfer a default policy rule request for delivery to the PCRF system;
the PCRF system configured to receive the default policy rule request, and responsively identify default policy rules and transfer the default policy rules for delivery to the packet data network gateway;
the packet data network gateway configured to receive the default policy rules;
the PCRF system configured to identify a reestablished communication between the PCRF system and the online charging server and, in response to identifying the reestablished communication, transfer a notification to the packet data network gateway to indicate the reestablished communication; and
the packet data network gateway configured to receive the notification.

9. The communication system of claim 8 wherein the PCRF system configured to identify the default policy rules is configured to:
identify a quality of service for each wireless communication device in a plurality of wireless communication devices; and
identify policy rules based on the quality of service.

10. The communication system of claim 9 wherein the quality of service is based on a total amount of data allocated to each respective wireless communication device in the plurality of wireless communication devices.

11. The communication system of claim 9 wherein the quality of service is based on payment history data associated with each respective wireless communication device in the plurality of wireless communication devices.

12. The communication system of claim 8 wherein the PCRF system configured to transfer the default policy requirement notification for delivery to the packet data network gateway is configured to transfer a session-rule-check attribute-value pair for delivery to the packet data network gateway.

13. The communication system of claim 8 wherein the packet data network gateway is further configured to:
in response to receiving the notification, transfer a request for policy rules based on the reestablished communication.

14. The communication system of claim 8 wherein:
the PCRF system is further configured to, prior to identifying the reestablished communication, transfer a subsequent default policy requirement notification for delivery to the packet data network gateway;
the packet data network gateway is further configured to receive the subsequent default policy requirement notification and responsively transfer a subsequent default policy rule request for delivery to the PCRF system; and
the PCRF system is further configured to receive the subsequent default policy rule request, and responsively identify subsequent default policy rules and transfer the subsequent default policy rules for delivery to the packet data network gateway.

15. A method of operating a policy and charging rules function (PCRF) system to provide default policy rules, the method comprising:
identifying a Sy interface interruption between the PCRF system and an online charging server;
in response to identifying the Sy interface interruption, transferring a default policy requirement notification for delivery to a packet data network gateway;
receiving a default policy rule request from the packet data network gateway;
responsive to receiving the default policy rule request, identifying a quality of service for each wireless communication device in group of one or more wireless communication devices and identifying policy rules based on the quality of service;
in response to identifying the policy rules, transferring the policy rules for delivery to the packet data network gateway;
identify a reestablished communication between the PCRF system and the online charging server; and
in response to identifying the reestablished communication, transferring a notification to the packet data network gateway to indicate the reestablished communication.

16. The method of claim 15 wherein the quality of service is based on at least one of a total amount of data allocated for each wireless communication device in the group of one or more wireless communication devices, and payment history data for each wireless communication device in the group of one or more wireless communication devices.

17. The method of claim 15 further comprising:
prior to identifying the reestablished communication, transferring a subsequent default policy requirement notification for delivery to the packet data network gateway;
receiving a subsequent default policy rule request from the packet data network gateway;
responsive to receiving the subsequent default policy rule request, identifying subsequent default policy rules based on the quality of service; and
in response to identifying the subsequent default policy rules, transferring the default policy rules for delivery to the packet data network gateway.

* * * * *